No. 875,749.
PATENTED JAN. 7, 1908.
W. H. TILSON.
CUTTING APPARATUS FOR CORN HARVESTERS.
APPLICATION FILED APR. 3, 1906.
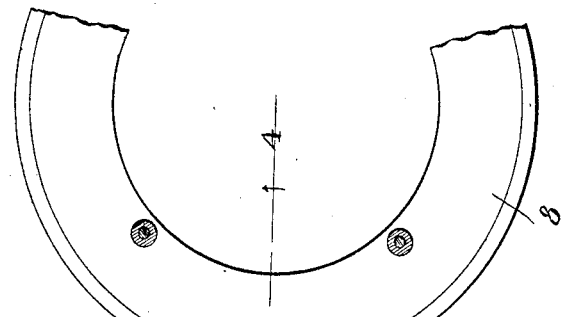
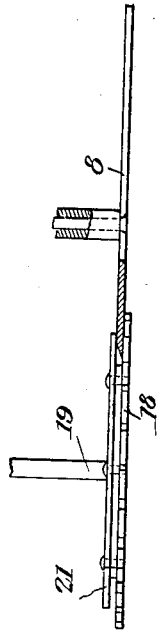
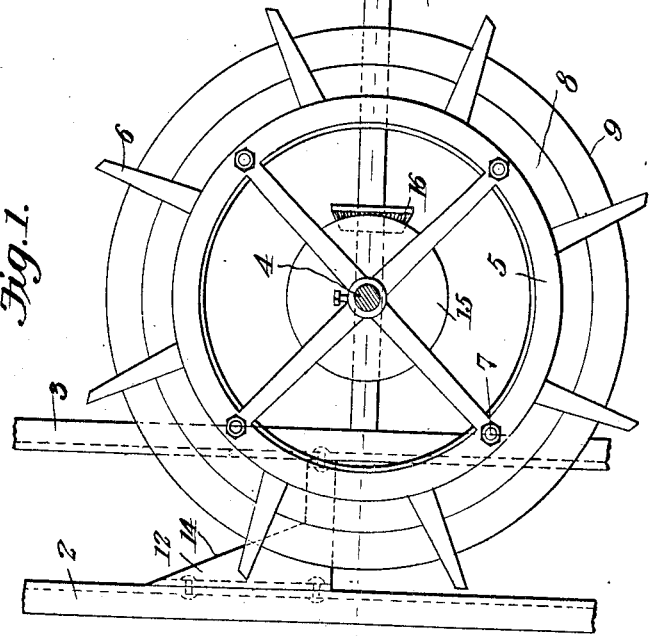
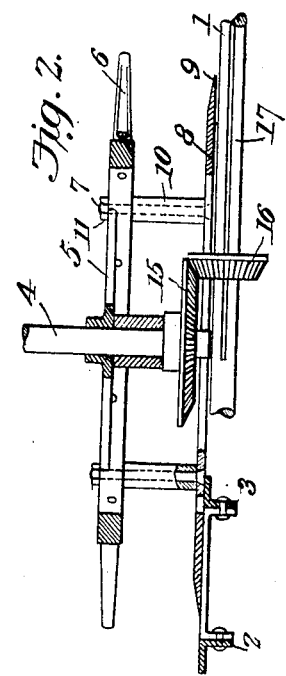
WITNESSES:
William H. Tilson  INVENTOR
By C. A. Snow & Co.
ATTORNEYS

UNITED STATES PATENT OFFICE.

WILLIAM H. TILSON, OF PLAINVIEW, TEXAS.

CUTTING APPARATUS FOR CORN-HARVESTERS.

No. 875,749.  Specification of Letters Patent.  Patented Jan. 7, 1908.

Application filed April 3, 1906. Serial No. 309,644.

*To all whom it may concern:*

Be it known that I, WILLIAM H. TILSON, a citizen of the United States, residing at Plainview, in the county of Hale and State of Texas, have invented a new and useful Cutting Apparatus for Corn-Harvesters, of which the following is a specification.

This invention relates to an improved cutting apparatus for corn harvesting machines, which, while capable of general application, is particularly designed to be used in connection with, and to constitute a part of, the improved corn harvester for which Letters Patent of the United States were granted to me October 23, 1906, and numbered 833,986.

The object of the present invention is to enable the rotary cutter to be located in close proximity to the main driving shaft of the machine; other objects are to simplify and improve the general construction and operation of the cutting apparatus.

With these and other ends in view, which will readily appear as the nature of the invention is better understood, the invention consists in the improved construction and novel combination and arrangement of parts, which will be hereinafter fully described and particularly pointed out in the claims.

In the drawings, Figure 1 is a plan view illustrating a preferred form of the improved cutting apparatus, the shaft carrying the rotary cutter being shown in section. Fig. 2 is a vertical sectional view taken on the plane indicated by the line 2—2 in Fig. 1. Fig. 3 is a plan view illustrating a modification. Fig. 4 is an edge elevation of an auxiliary cutter showing the annular cutter in section cut on the line 4—4 of Fig. 3.

Corresponding parts in the several figures are indicated throughout by similar characters of reference.

In the preferred form of the invention illustrated in Figs. 1 and 2, 1 designates the main driving shaft of a machine to which the invention is applied, and 2, 3 represent angle bars between which the stalks are guided into engagement with the cutting apparatus. A vertical, or approximately vertical, shaft 4, which is supported at right angles to the shaft 1, or approximately so, carries a wheel or disk 5 having radially extending arms or spokes 6 that extend across the space or path between the guide bars 2 and 3. The wheel or disk 5 is provided with a plurality of depending bolts 7 serving to support an annular cutting disk 8 having a beveled cutting edge 9; said cutting disk being spaced from the wheel or disk 5 by means of spacing sleeves 10 upon the bolts 7, which latter are equipped with tightening nuts 11. The cutting disk is supported directly above and adjacent to the horizontal plane of the guide bars 2 and 3, and it is adapted to coöperate with a stationary cutter 12 suitably connected with and supported by the guide bars 2, 3, said stationary cutter being preferably provided with an obliquely disposed cutting edge 14 coöperating with the edge 9 of the disk 8 to sever the stalks that may be brought into engagement therewith by the radial arms or spokes 6 of the wheel 5, or by such other means as may be provided for the purpose.

The shaft 4 is provided with a bevel gear 15 meshing with a bevel pinion 16 upon the main driving shaft 1, said bevel pinion being disposed within the opening or aperture of the annular cutting disk, as shown. By this construction, the cutting apparatus may not only be disposed very closely adjacent to the main shaft 1; but the position of the cutting apparatus may be conveniently changed longitudinally of the main shaft by providing the latter with a spline, as 17, engaging the pinion 16, the position of which latter upon the shaft is thus capable of being shifted.

In Figs. 3 and 4 of the drawing, there has been illustrated a modification which consists simply in substituting for the obliquely disposed stationary knife 12 a rotary cutter 18 mounted upon a shaft 19; and provided with a serrated edge forming teeth 20. Connected with and suitably spaced from the rotary cutter 18 is a disk 21 which overlaps the cutting edge of the annular cutter 8, which latter is thus maintained in constant engagement with the rotary cutter 18.

Having thus described the invention, what is claimed is:—

1. A cutting device including a shaft, a main annular cutter carried thereby and having a circular cutting edge, a peripherally serrated auxiliary cutter supported in engagement with the main cutter, and a disk of less diameter than and disposed over the auxiliary cutter and overlapping the edge of the main cutter.

2. A cutting device including a driving shaft, a wheel upon said shaft, an annular cutter, bolts connecting the cutter with the wheel, and spacing sleeves upon said bolts.

In testimony that I claim the foregoing as my own, I have hereto affixed my signature in the presence of two witnesses.

WILLIAM H. TILSON.

Witnesses:
S. H. McMahon,
C. C. Williams.